(12) United States Patent
Hachtel

(10) Patent No.: US 6,367,890 B1
(45) Date of Patent: Apr. 9, 2002

(54) METHOD AND APPARATUS FOR ACTIVATING A PUMP OF A BRAKING SYSTEM AS A FUNCTION OF THE PRESSURE DROP

(75) Inventor: Juergen Hachtel, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/339,449

(22) Filed: Jun. 24, 1999

(30) Foreign Application Priority Data

Jun. 26, 1998 (DE) ......................................... 198 28 552

(51) Int. Cl.⁷ ................................................. B60T 8/42
(52) U.S. Cl. .................. 303/115.4; 303/11; 303/DIG. 1
(58) Field of Search ................................ 303/115.4, 10, 303/11, DIG. 1, DIG. 11, 116.1, 116.2

(56) References Cited

U.S. PATENT DOCUMENTS

| | | | | |
|---|---|---|---|---|
| 3,794,845 A | * | 2/1974 | Riddoch | 290/38 R |
| 4,225,195 A | * | 9/1980 | Weise et al. | 303/106 |
| 4,484,784 A | * | 11/1984 | Leiber | 303/92 |
| 4,664,452 A | * | 5/1987 | Kubota et al. | 303/22 R |
| 4,753,492 A | * | 6/1988 | Leiber et al. | 303/92 |
| 4,848,847 A | * | 7/1989 | Reinartz et al. | 303/11 |
| 4,880,282 A | * | 11/1989 | Makino et al. | 303/116 |
| 4,914,917 A | * | 4/1990 | Schonlau | 60/545 |
| 5,221,125 A | * | 6/1993 | Okochi et al. | 303/10 |
| 5,358,320 A | * | 10/1994 | Fuchida | 303/116.1 |
| 5,373,454 A | * | 12/1994 | Kanda et al. | 364/551.01 |
| 5,695,260 A | * | 12/1997 | Tanaka et al. | 303/122.12 |
| 5,733,017 A | * | 3/1998 | Nakashima et al. | 303/10 |
| 5,788,337 A | * | 8/1998 | Eckert | 303/3 |
| 5,941,608 A | * | 8/1999 | Campau et al. | 303/113.4 |
| 5,957,549 A | * | 9/1999 | Nagai et al. | 303/122.12 |
| 6,003,960 A | * | 12/1999 | Gronau et al. | 303/167 |
| 6,007,163 A | * | 12/1999 | Sawada | 303/122.09 |
| 6,092,878 A | * | 7/2000 | Watanabe | 303/115.4 |
| 6,109,703 A | * | 8/2000 | Takahashi | 303/155 |

FOREIGN PATENT DOCUMENTS

| | | |
|---|---|---|
| DE | 381 31 72 | 4/1988 |
| DE | 381 82 60 | 5/1988 |
| DE | 41 02 496 | 2/1992 |
| DE | 42 32 130 | 9/1992 |
| DE | 195 46682 | 12/1995 |
| DE | 195 48248 | 12/1995 |
| DE | 196 48 596 | 11/1996 |

OTHER PUBLICATIONS

Wolf–Dieter Jonner, et al., "Electrohydraulic Brake System—The First Approach To Brake–By–Wire Technology",, SAE Paper No. 960991.
\*\* Wolf–Dieter Jonner et al., "Antiblockiersystem Und Antriebsschlupfregelung Der Funften Generation", ATZ 95 (1993) vol. 11.

\* cited by examiner

Primary Examiner—Christopher P. Schwartz
Assistant Examiner—Benjamin A. Pezzlo
(74) Attorney, Agent, or Firm—Kenyon & Kenyon

(57) ABSTRACT

A method and apparatus for activating a pump of a braking system for delivering a pressure medium, in which the creation of the activation signal, in particular the switch-on signal for the pump, is dependent on at least one condition. Creation of the switch-on signal of the pump is dependent on a pressure gradient variable, in particular on an accumulator pressure gradient. On the one hand this makes possible compensation for disturbances, for example the influence of temperature on the pressure medium, which is expressed as a small pressure gradient; and on the other hand it prevents the pressure from falling greatly below a lower threshold value in the event of a high volume demand request, i.e., prevents a severe pressure drop and thus a large pressure gradient.

7 Claims, 4 Drawing Sheets

METHOD AND APPARATUS FOR ACTIVATING A PUMP OF A BRAKING SYSTEM AS A FUNCTION OF THE PRESSURE DROP

FIELD OF THE INVENTION

The present invention relates to a method and apparatus for controlling a pump of a braking system for delivering a pressure medium.

BACKGROUND INFORMATION

German Published Patent Application No. 195 48 248 discusses a method and an apparatus for controlling a pump of an electrohydraulic braking system. In this method and apparatus, the hydraulic fluid is injected from a pressure accumulator through valves into the wheel brake cylinder, the pressure accumulator being charged by a pump. In order to make charging of the pressure accumulator as noiseless as possible, the pump is activated with a demand-based inter-pulse ratio of a PWM signal, depending on the required volume of hydraulic fluid and a pressure in the pressure accumulator. The PWM signal is modified, as a function of a definable pressure value, with the deviation of the actual pressure from that value (pressure accumulator hysteresis). In this context, a plurality of fixed pressure threshold values are used for activation at appropriate delivery capacity. German Published Patent Application No. 195 48 248 specifically describes the activation of a pump in an electrohydraulic braking system. A braking system comparable thereto is also described in SAE Paper 960991.

Also known are methods and apparati in which the return flow pumps in hydraulic braking systems are activated as a function of the generator voltage. Hydraulic braking systems of this kind are known, for example, from the offprint of ATZ 95 (1993) Vol. 11, or from German Published Patent Application No. 195 46 682. German Published Patent Application No. 42 32 130 describes, for this purpose, a method and an apparatus for controlling an electric motor-driven hydraulic pump that generates auxiliary pressure for a braking system having an antilock braking control system and/or a drive slip control system. For that purpose, it is equipped with a variable activation clock cycle made up of a pulse/interpulse sequence. The voltage induced in generator fashion by the pump motor during the interpulses is analyzed as an indication of the pump rotation speed. By differentiating this generator voltage (as the rotation speed actual value) with a reference variable for the pump motor rotation speed created in an antilock braking or drive slip control system, a difference variable is then made available to a downstream controller. The output signal of the controller is used to create the pulse-width modulated adjusting signal for pump activation. The drive motor of the hydraulic pump is switched on and off in time with this pulse-width modulated adjusting signal.

It has been found that the known method and the corresponding apparati are not capable of yielding optimum results in every respect. With the known braking systems, a volume demand request is always necessary in order to activate the pump. A volume demand request occurs, for example, during the braking operation when volume is withdrawn from the braking circuit to be injected into the wheel brake cylinder. But according to the existing art, it is only after the pressure has fallen below a threshold value that the volume demand request resulting therefrom is recognized. The result is that the delivery capacity associated with the respective threshold value is utilized relatively late, and the pressure has then already fallen below the threshold value.

In hydraulic braking systems, the generator voltage is used, as a value representing rotation speed, to activate the pump. Because of the dead-time behavior in the conversion of the generator voltage and pressure conditions, however, here again it is impossible to prevent the pressure from falling below its limits. A further disadvantage with both aforesaid methods is the fact that in the case of a very slow pressure drop, e.g. at low temperatures or when the ambient temperature is falling, the reaction to the pressure change occurs very late, in fact not until the pressure has fallen below the threshold value.

SUMMARY OF THE INVENTION

Creation of the activation signal, in particular of the switch-on signal of the pump, is dependent on at least one condition. One condition for creating an activation signal for activating the pump of the braking system is constituted, according to the present invention, at least as a function of a pressure gradient variable. This pressure gradient variable represents an actual value of a pressure gradient of the pressure medium in the braking system. The condition for creation of the activation signal for activating the pump is referred to as the "dependency mode" and is configured, for example, as a comparison of the pressure gradient variable to various pressure gradient threshold values, and/or as an analysis of a characteristics diagram with the pressure gradient variable as one characteristics diagram variable. Selection of the various pressure gradient threshold values is accomplished with the aid of at least one reference wheel brake pressure threshold, which also indicates whether or not a volume demand in terms of the pressure medium exists in the braking system.

With the approach according to the present invention, the use of the pressure gradient variable as the basis for the activation or switch-on condition of the pump of the braking system prevents the pressure from falling below the lowest threshold value, or makes possible much less of a decrease below it. By monitoring the pressure gradient it is moreover possible, even without a volume demand request in the braking system, to compensate for the influence of disturbances, for example a change in temperature and a resulting change in the pressure of the pressure medium, and thus to keep the pressure at a desired pressure value. With the use of the pressure gradient as the switch-on condition, it is moreover possible to achieve a lower average pressure and thus a lower average pump output with a longer-duration phase of high volume demand, since it is the information about the change in pressure that is already being used, and not exclusively the fact that pressure has fallen below the threshold value. The use of fixed pressure threshold values in addition to the pressure gradient threshold values results in a higher degree of reliability in terms of the necessary pressure conditions. A further advantage is that because the reference wheel brake pressure threshold values are stipulated as the selection criterion for the respective pressure gradient threshold value, the pressure gradient can be established in demand-oriented and situation-dependent fashion.

DETAILED DESCRIPTION

Figure 1:
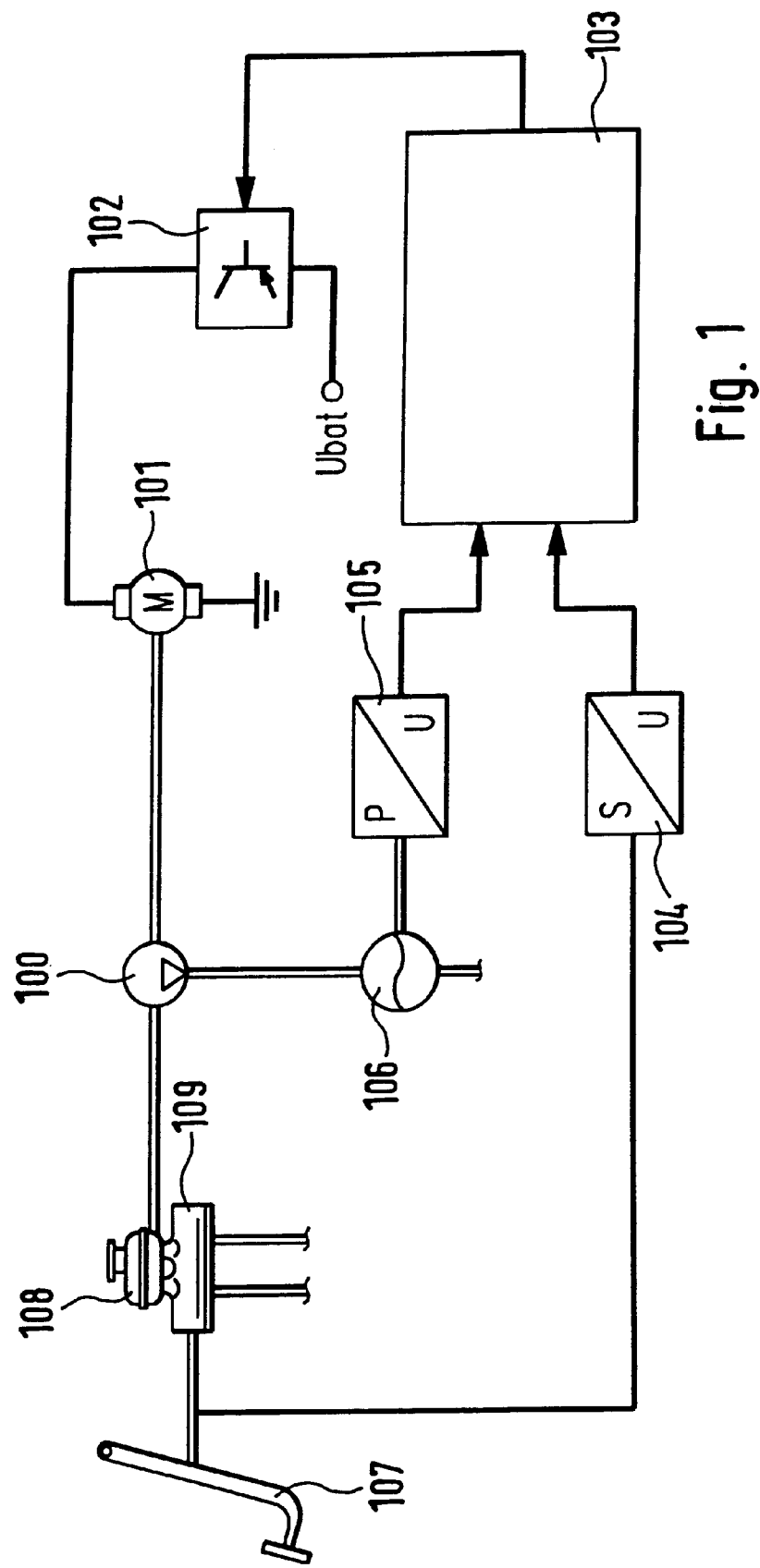
FIG. 1 shows a preferred exemplary embodiment of a braking system in the form of a block diagram.

FIG. 1 depicts a block diagram showing a master brake cylinder 109 with reservoir 108. A brake pedal 107 is connected via a piston rod to master brake cylinder 109. Movement of the piston rod is sensed by way of a sensor 104. The output of sensor 104 goes into a control unit 103. Master brake cylinder 109 is connected via a line for the brake pressure medium to a pump 100 and associated pump motor 101. Pump 100 in turn is in contact with a pressure accumulator 106 of the electrohydraulic braking system, and supplies it. The remainder of the braking circuit or circuits known from the aforesaid documents and not essential to the present invention is omitted from FIG. 1. Mounted on pressure accumulator 106 is a pressure sensor 105 whose output signal is also conveyed to control unit 103. A switching means 102 is connected to control unit 103 via a line. This switching means 102 is connected on the one hand to supply voltage Ubat, and on the other hand to pump motor 101.

With the aid of brake pedal 107, the driver defines the desired reference wheel brake pressure as pedal travel S, which is sensed by sensor 104. The braking input, the pedal movement, and the wheel brake pressure that is to be attained are thus correlated. In order to allow rapid braking reaction, pressure accumulator 106 is charged from the reservoir via accumulator pump 100. Pump motor 101 is connected to or disconnected from supply voltage Ubat via switching means 102. This switching means is controlled by control unit 103. As input variables, the control unit 103 receives variables representing pressure. On the one hand, the accumulator pressure Ps is sensed by way of pressure sensor 105 and output to the control unit 103. On the other hand, the desired reference wheel brake pressure Prs, which is correlated with the travel of brake pedal S when actuated by the driver, is sensed by way of sensor 104 and also conveyed to control unit 103. From the accumulator pressure Ps sensed by sensor 105, the accumulator pressure gradient Psg necessary for the method is created in control unit 103.

Figure 2:
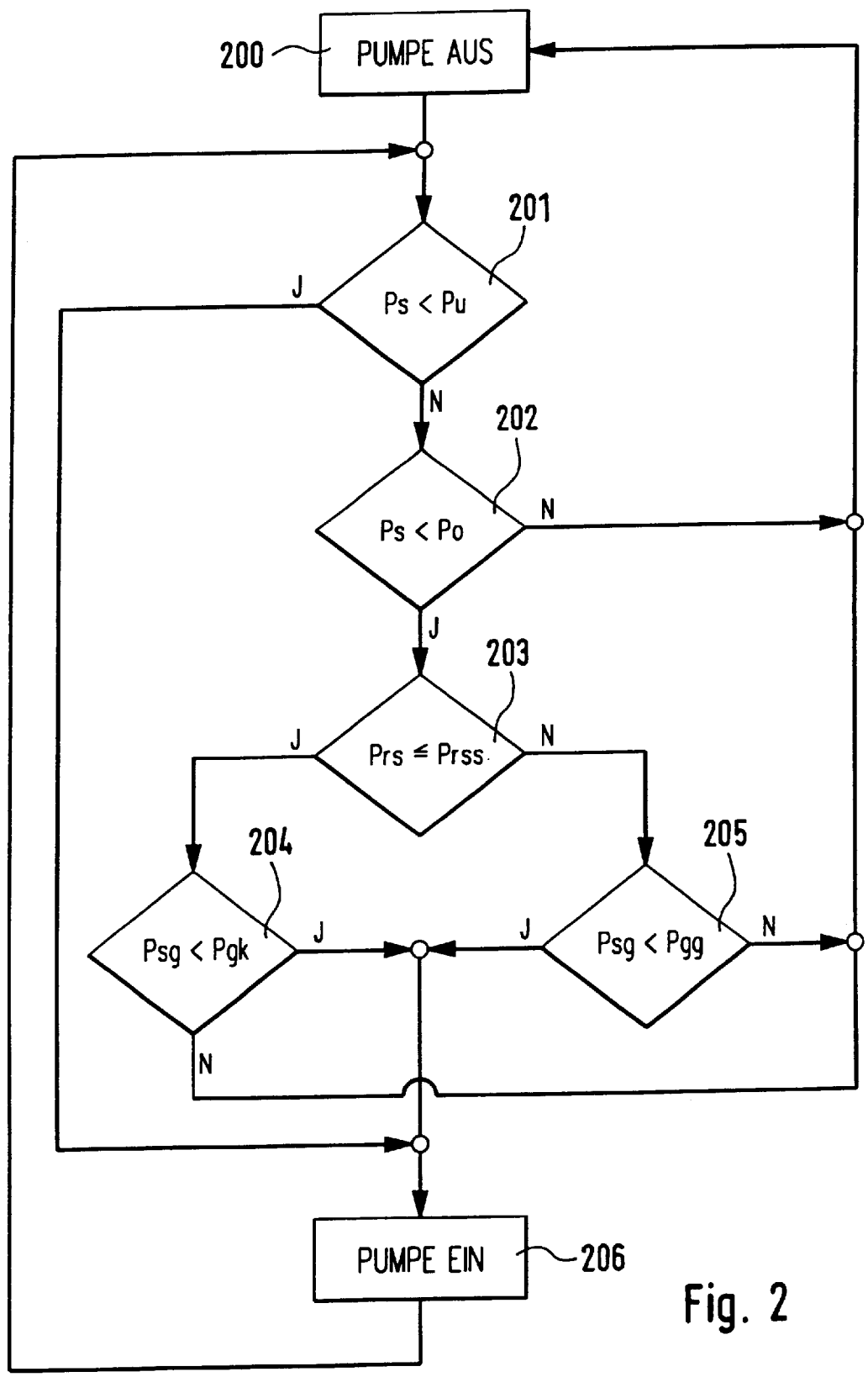
FIG. 2 shows a flow chart representing a method of the exemplary embodiment for activating a pump.

FIG. 2 shows the method and the programmed execution in control unit 103; it is assumed that the signals are prepared for further processing in a program or in a corresponding circuit. The method depicted in this flow chart can be represented on the one hand as hard-wired logic or as its programmed equivalent in the control unit 103. It is initially assumed that pump motor 101 is not connected to supply voltage Ubat (200). In block 201, a check is made as to whether accumulator pressure Ps is less than a predefined lower pressure threshold Pu. If so, the pump motor 101 is connected to supply voltage Ubat by way of switching means 102, and pump 100 is switched on (206). If the accumulator pressure Ps is not below the predefined threshold Pu, execution passes to block 202, which queries whether the accumulator pressure Ps is below an upper pressure threshold Po. If the accumulator pressure Ps is not below the upper pressure threshold Po, the pump 100 remains switched off and execution again returns to block 200. If the accumulator pressure is below the upper pressure threshold Po, then in block 203 a query is made as to the existence of a volume demand request. This involves checking whether the reference wheel brake pressure Prs is less than or equal to a predefined reference wheel brake pressure threshold Prss. Since it is assumed in this exemplary embodiment that there are only two pressure gradient threshold values (Pgk and Pgg), the fact that the reference wheel brake pressure Prs is below the reference wheel brake threshold Prss means that no volume demand request is present. If so, execution then passes to block 204. This query checks whether the actual accumulator pressure gradient Psg is less than a quantitatively small pressure gradient threshold Pgk that indicates a slow decrease in the accumulator pressure resulting, for example, from cooling of the pressure medium. If the reference wheel brake pressure Prs reaches or exceeds the reference wheel brake pressure threshold value Prss, execution passes to a second query 205 with a quantitatively large accumulator pressure gradient Pgg that signals a rapid decrease in the accumulator pressure Ps. Because only two pressure gradient thresholds (Pgk and Pgg) are used here, only one reference wheel brake pressure Prss is used. The fact that this reference wheel brake pressure threshold Prss has been exceeded then means that a volume demand request is present. If so, a check is then made in 205 as to whether the actual pressure gradient Psg is less than the predefinable pressure gradient threshold value Pgg. If the actual pressure gradient Psg is less, i.e. more negative, this means that the pressure is decreasing very quickly, more quickly than represented by the predefinable accumulator pressure gradient threshold value Pgg. The pump 100 is then switched on, i.e., pump motor 101 is connected by switching means 102 to the supply voltage Ubat. Otherwise pump 100 remains switched off. If no volume demand request exists—which in this exemplary embodiment is the same as saying that the reference wheel brake pressure threshold value Prss is greater than or equal to the reference wheel brake pressure Prs—the small pressure gradient threshold value Pgk is queried in accordance with block 204. If block 204 reveals that the actual pressure gradient Psg is less, i.e., more negative, than the pressure gradient threshold value Pgk, the pump 100 is switched on, i.e., pump motor 100 is connected by switching means 102 to supply voltage Ubat. If the actual pressure gradient Psg falls below the threshold value Pgk, pump motor 101 has voltage applied to it even though no volume demand request is present. Otherwise pump 100 also remains switched off. Instead of the respective threshold value comparisons in blocks 203, 204, and 205, it is also possible to perform an analysis of a corresponding characteristic curve or characteristics diagram in these blocks.

Figure 3:
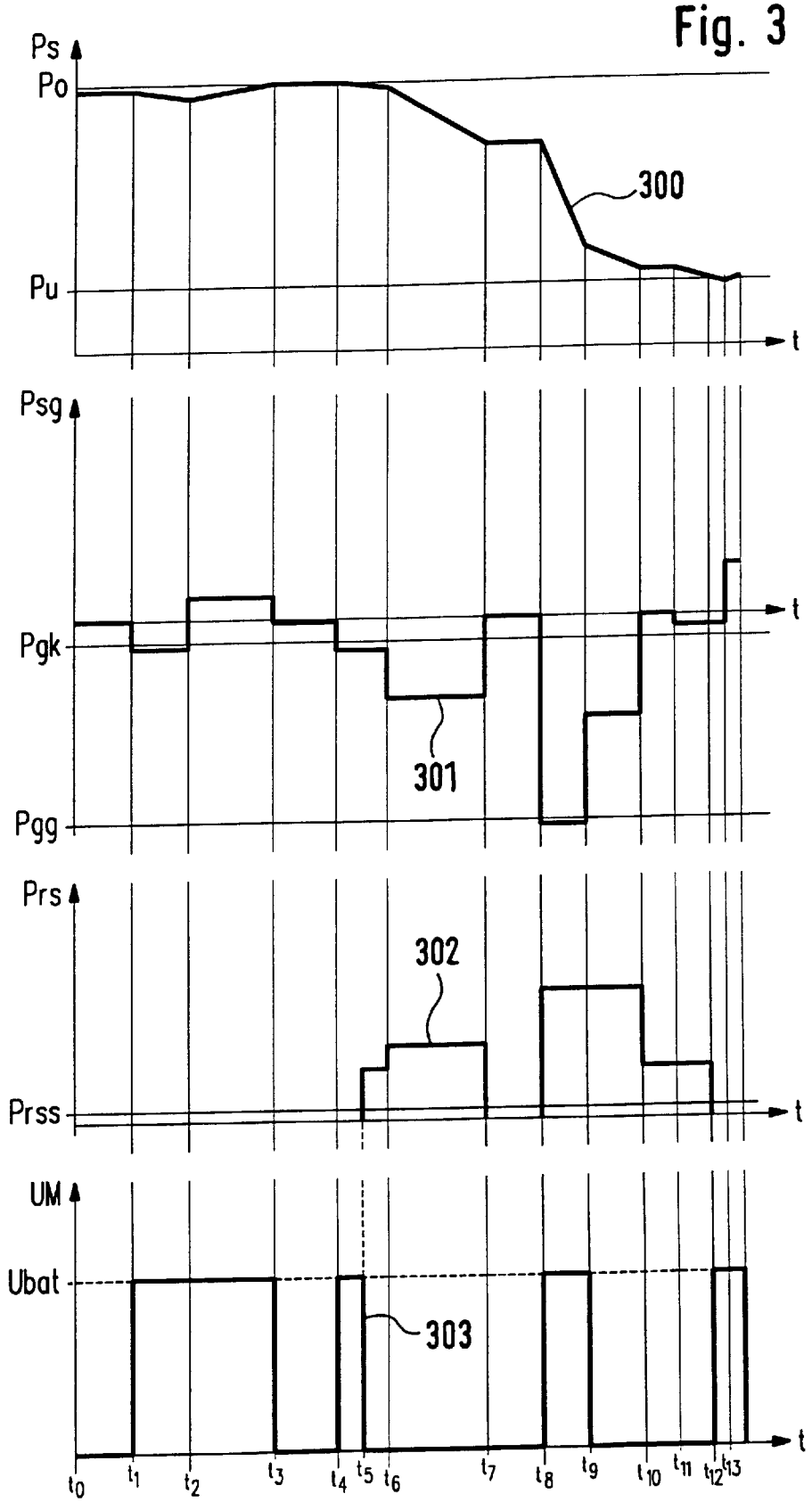
FIG. 3 shows signal profiles of variables that are important in conjunction with the method according to the present invention.

FIG. 3 schematically depicts, with reference to the signal profile of the accumulator pressure of an electrohydraulic braking system, the signals for accumulator pressure Ps, accumulator pressure gradient Psg, reference wheel brake pressure Prs, and motor voltage UM. In FIG. 3, the signal profiles are depicted with no consideration given to sampling time. The signal profiles for the accumulator pressure gradient Psg 301, the reference wheel brake pressure Prs 302, and the motor voltage UM 303 are therefore depicted with vertical signal edges, and the reaction to arrival at a threshold value is instantaneous. The starting point at t0 is an actual pressure close to the upper pressure threshold Po. At time t1 this pressure decreases slowly, for example, due to cooling, but there is no volume demand request in the form of a reference wheel brake pressure value Prs above the wheel brake pressure threshold Prss. The accumulator pressure gradient Psg is below the small pressure gradient threshold value Pgk. Since the accumulator pressure Ps is below the upper threshold value Po, the pressure gradient Psg is also below the gradient threshold value for slow pressure decrease Pgk, and since at this time t1 the reference wheel brake pressure Prs is also below the reference wheel brake pressure Prss, an activation of the motor occurs for the period t2–t1.

Switching on the pump 100 causes the pressure to rise by time t3 to the value of the upper pressure threshold Po. When the upper pressure threshold Po is reached, the pump 100 is switched off at t3. As a result, for example, of cooling of the pressure medium, this accumulator pressure value decreases between t3 and t6 from the value of the upper pressure threshold Po to a value below said upper pressure threshold Po. Because of the fact that in the process, the actual pressure gradient Psg falls below the small pressure gradient Pgk, pump motor O1 is switched on again at time t4.

Since the driver subsequently, at time t5, actuates the brake pedal, and a reference wheel brake pressure Prs greater than the reference wheel brake pressure threshold Prss is thus present, pump motor 101 is switched off even though the small pressure gradient threshold Pgk has not been reached. The reason for this is that the purpose of the small pressure gradient threshold Pgk is to compensate for temperature or disturbance, and in this exemplary embodiment each volume demand request generates a reference wheel brake pressure Prs which is greater than the wheel brake pressure threshold Prss predefined here. When a reference wheel brake pressure Prs above the wheel brake pressure threshold Prss is present, the compensation function of the small pressure gradient threshold Pgk is thus cut out, and the only check made is whether the value is below the large pressure gradient threshold Pgg, so that even an increase in the reference wheel brake pressure Prs at t6, and the quantitative pressure gradient increase associated therewith, does not result in any activation of the pump motor. Only the rapid pressure drop following t8 and the associated drop in value below the large pressure gradient threshold value Pgg, triggered by a high volume demand request in the form of a high reference wheel brake pressure Prs, causes pump motor 101 to be switched on again, thus preventing the pressure from falling below the lower pressure threshold Pu. If the pressure nevertheless falls below this lower pressure threshold Pu when another volume demand request occurs, due to the low pressure level, then at t12 pump motor 101 is connected to supply voltage Ubat regardless of the pressure gradient Psg. The lower pressure threshold Pu thus functions as a safety limit in order to guarantee a minimum pressure level in the accumulator and the braking system. The result of the additional activation by way of pressure gradients, however, is that the pressure does not fall, or does not fall too far, below this lower pressure threshold precisely in the event of a rapid and large pressure drop.

Figure 4:
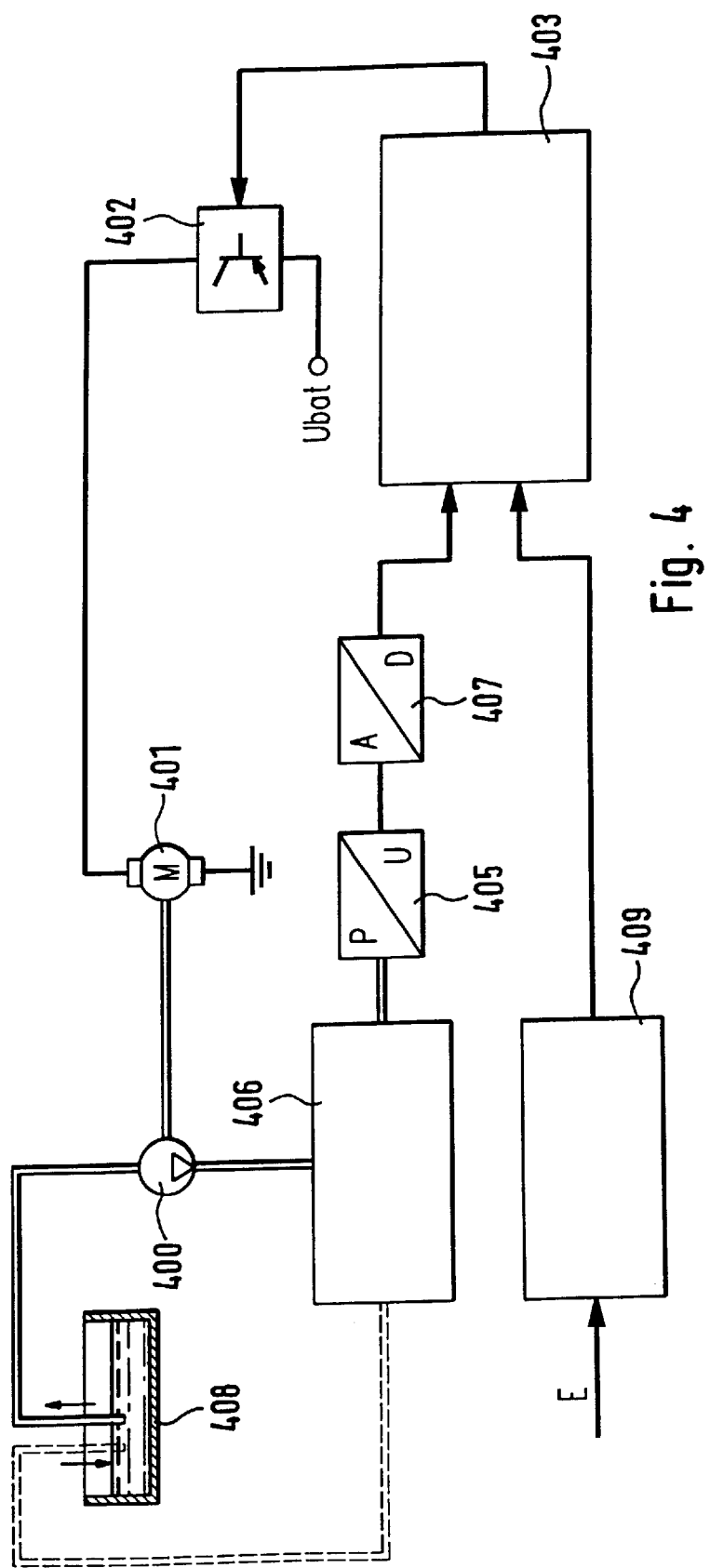
FIG. 4 depicts a general braking system depicted as a hydraulic braking system having an arbitrary pressure medium.

In addition to the use of the method in an electrohydraulic braking system, FIG. 4 depicts a further exemplary embodiment in the form of a general braking system. The general braking system also comprises, for example, in addition to an electrohydraulic braking system such as is known from the aforesaid documents or from the first exemplary embodiment, a hydraulic braking system comparable to the one from the ATZ offprint or German Published Patent Application No. 195 46 682. In the general braking system in FIG. 4, 408 indicates an equalization vessel and 400 a pump that delivers the pressure medium out of equalization vessel 408 into braking system 406. Pump 400 can be, as in the previous exemplary embodiment, an accumulator pump in an electrohydraulic braking system, but can also, for example, be a return flow pump in a hydraulic braking system.

The associated pump motor 401 is connected to and disconnected from the supply voltage Ubat via a switching means 402. Switching means 402 is operated via a control system 403. The input variable of the control system is also a variable representing the reference wheel brake pressure Prs, but can also, in contrast to the previous exemplary embodiment, come from a higher-level logic system (e.g. ABS, ASR, FDR logic system) 409. The input variable E of logic system 409 is a variable representing the braking input of the driver, transmitted, for example, via a pressure sensor, pedal travel sensor, or the like. This variable representing the braking input is expressed at the output of logic system 409 in a wheel brake pressure setpoint. The second input variable used for control system 403, in addition to the reference wheel brake pressure, is a pressure from braking system 406 that is sensed via pressure sensor 405 and converted by way of A/D converter 407 into a form corresponding to the logical value of the reference wheel brake pressure. The pressure from braking system 406 can also be, for example, in addition to the accumulator chamber pressure used in the previous exemplary embodiment, a braking circuit pressure. The pressure variable or pressure gradient variable used is either sensed by way of sensors or, as is known from the existing art, estimated. The input variables into control system 403 are thus in each case signals that represent the information of a pressure of braking system 406 and a reference wheel brake pressure Prs. The method and the schematic signal profiles are then, in accordance with the principle according to the present invention, analogous to those of the previous exemplary embodiment, and reference is thus made at this juncture to FIGS. 2 and 3 of the embodiment of the electrohydraulic braking system.

Utilization of the method according to the present invention in a braking system with a pneumatic pressure medium is also advantageous, so that altogether, it is useful to utilize the method according to the present invention in a braking system that is, for example, hydraulic, electrohydraulic, pneumatic, electropneumatic, or the like. It is important to note in this context that in the case of incompressible pressure media, the derivative of the pressure variable over time is useful as the pressure gradient, while with compressible pressure media in the braking system, in addition to the pressure gradient over time it is advantageous also to take into account a location-dependent gradient of the pressure variable.

In the exemplary embodiment, Prss indicates only a threshold value for the reference wheel brake pressure. A useful supplement is to use several different threshold values for the reference wheel brake pressure as the selection criterion for various pressure gradient threshold values. It thereby becomes possible to define different discrete pressure thresholds, and to monitor those pressure thresholds by comparing the actual pressure gradient to the respective pressure gradient threshold value. In this context, the actual pressure is held at the respective pressure threshold if no volume demand request is present, i.e., for example if the actual pressure is far from the preset pressure threshold due to cooling of the braking medium. In addition, by defining pressure gradient threshold values of different magnitudes it is possible to adapt the activation of the pump for pressure buildup purposes to the particular demand in various situations.

In addition to the use of predefinable pressure gradient threshold values that are allocated on the basis of a comparison between the reference wheel brake pressure and the associated threshold values, it is advantageous to use characteristic curves or characteristics diagrams for the pressure gradient and/or the reference wheel brake pressure in order to ascertain the activation signal. The use of threshold values and/or characteristics diagrams can thus be generalized to a utilization of dependency modes in order to create the activation signal. A distinction is thus made between two dependency modes, depending on whether or not a volume demand requirement is present. The one dependency mode is therefore selected when a volume demand request is present, and the other when it is not.

As a further embodiment, it would be advantageous for the pump, once the switch-on condition has been met, not to be acted upon by the full supply voltage Ubat for the entire switch-on time period, but rather to activate the pump for that switch-on time period in cycled fashion depending on the situation, using a PWM signal, and thus for the pump to be acted upon by a resulting effective voltage value that is less than Ubat. A continuous change in the voltage being applied to the pump, as a function of the existing pressure gradient, would also be useful.

What is claimed is:

1. A method for creating an activation signal for activating a pump for delivering a pressure medium in a braking system, the activation signal corresponding to a switch-on signal for the pump and being dependent on at least one predefinable condition, the method comprising the steps of:

determining a pressure magnitude corresponding to an actual value of a pressure of the pressure medium;

ascertaining a pressure gradient variable representing an actual value of a pressure gradient of the pressure medium; and predefining the predefinable condition as a dependency such that the activation signal is created as a function of the ascertained pressure magnitude and the pressure gradient variable.

2. The method according to claim 1, wherein the ascertained pressure gradient variable corresponds to at least one pressure gradient variable, and wherein the predefinable condition is embodied as the dependency mode for the creation of the activation signal in accordance with at least one of the following steps:

comparing the at least one pressure gradient variable to at least one pressure gradient threshold value, analyzing at least one characteristics diagram, the pressure gradient corresponding to a characteristics diagram variable, and comparing at least one actual pressure to at least one of an upper pressure threshold and a lower pressure threshold, the comparing of the at least one actual pressure being used as a further condition for creating the activation signal for activating the pump of the braking system.

3. The method according to claim 2, wherein the pressure gradient corresponds to a plurality of pressure gradients, the method further comprising at least one of the steps of:

predefining the plurality of pressure gradients as a plurality of pressure gradient threshold values, at least one of the plurality of pressure gradient threshold values representing a slow pressure drop in the braking system, and at least another one of the plurality of pressure gradient threshold values representing a rapid pressure drop in the braking system; and predefining the plurality of pressure gradient threshold values as a function of selection criteria including at least one of:
   a volume demand request ascertained at least as a function of a reference wheel brake pressure,
   a comparison of at least one wheel brake pressure setpoint to at least one reference wheel brake pressure threshold value, and
   an analysis of a characteristics diagram in accordance with the at least one wheel brake pressure setpoint.

4. The method according to claim 3, wherein:

the upper pressure threshold and the lower pressure threshold are defined as a plurality of pressure threshold values, at least one of the plurality of pressure threshold values and the plurality of pressure gradient threshold values is associated with at least one of the at least one wheel brake pressure setpoint and the at least one reference wheel brake pressure threshold value.

5. The method according to claim 1, wherein:

the predefinable condition is predefined, as the dependency mode, as a function of a volume demand request, the dependency mode corresponds to at least two dependency modes, a selection is made from the at least two dependency modes as a function of the volume demand request, a first one of the at least two dependency modes is used when no volume demand request in terms of the pressure medium in the braking system is present, and another one of the at least two dependency modes is used when the volume demand request in terms of the pressure medium is present.

6. The method according to claim 4, wherein, when the braking system corresponds to an electrohydraulic braking system including an accumulator for the pressure medium:

an accumulator pressure gradient is used as the pressure gradient variable representing the actual value of the pressure gradient of the pressure medium, and the plurality of pressure threshold values and the plurality of pressure gradient threshold values are associated with an accumulator pressure.

7. An apparatus for creating an activation signal for activating a pump for delivering a pressure medium in a braking system, the activation signal corresponding to a switch-on signal for the pump and being dependent on at least one predefinable condition, the apparatus comprising:

an arrangement for determining a pressure magnitude corresponding to an actual value of a pressure of the pressure medium;

an arrangement for ascertaining a pressure gradient variable representing an actual value of a pressure gradient of the pressure medium; and an arrangement for predefining the predefinable condition as a dependency mode such that the activation signal is created as a function of the ascertained pressure magnitude and the pressure gradient variable.

* * * * *